No. 798,836. PATENTED SEPT. 5, 1905.
J. D. SHERBROOK.
ARTIFICIAL BAIT.
APPLICATION FILED MAR. 15, 1905.
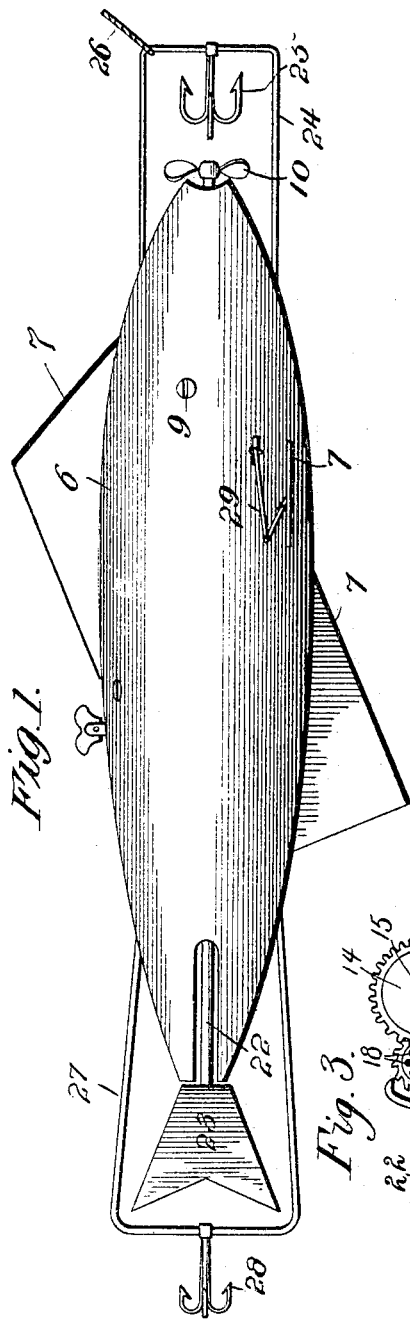
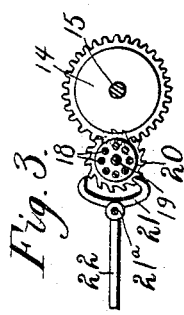
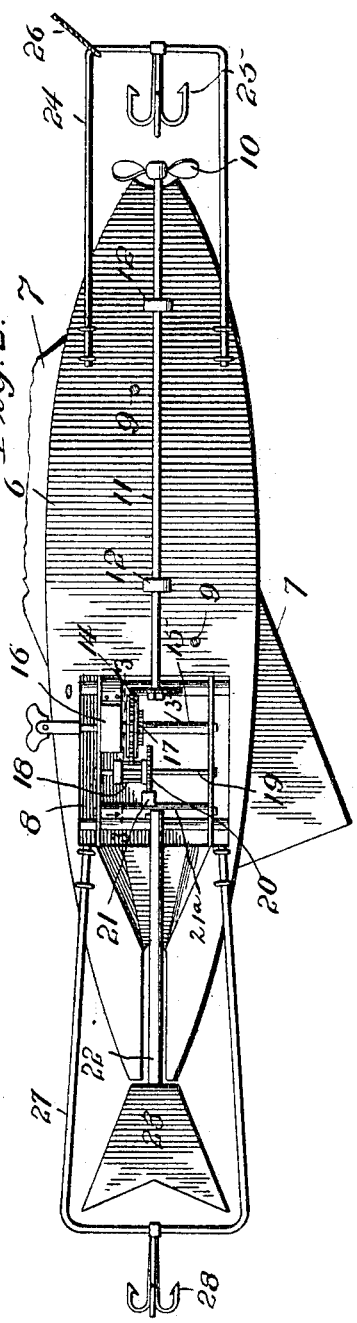
WITNESSES:
INVENTOR
Jesse D. Sherbrook,
BY
Milo B. Stevens and Co.
Attorneys.

UNITED STATES PATENT OFFICE.

JESSE D. SHERBROOK, OF BEULAH, MICHIGAN.

ARTIFICIAL BAIT.

No. 798,836.      Specification of Letters Patent.      Patented Sept. 5, 1905.

Application filed March 15, 1905. Serial No. 250,207.

*To all whom it may concern:*

Be it known that I, JESSE D. SHERBROOK, a citizen of the United States, residing at Beulah, in the county of Benzie and State of Michigan, have invented new and useful Improvements in Artificial Bait, of which the following is a specification.

My invention relates to artificial fish-bait; and it consists in a bait of this kind which is self-propelled in order to simulate the movement of a natural fish in the act of swimming.

In the accompanying drawings, Figure 1 is an elevation of the invention. Fig. 2 is an inside view thereof. Fig. 3 is a horizontal sectional view on the line 3 3 of Fig. 2.

Referring specifically to the drawings, 6 denotes the body of the bait which is in the shape of a fish. Fins 7 are provided, and the body will also be suitably colored in order that it may bear close resemblance to a natural fish. The body of the bait is in two parts, which are recessed on the inside, as at 8, to receive the motor, to be described, and after the latter is in position the two parts are secured together by screws 9 or other suitable fastening means.

When in use, the bait is driven through the water by means of a propeller 10, arranged at the head and actuated by a spring-motor. The propeller-shaft 11 is mounted in bearings 12 inside the body of the bait, and at its inner end said shaft has a gear 13, which meshes with a gear 14 on the motor-shaft 15. The motor-shaft is provided with a spring 16 and a pawl-and-ratchet device 17, arranged in the usual manner. The gear 14 meshes with a gear 18 on the escapement-shaft 19, having an escapement-wheel 20, which engages the pallet 21. The pallet is secured to a shaft 21ª, having its bearings in the motor-frame. A stem 22 is secured to the shaft 21ª and extends rearwardly and outside the body, the outer end of the stem being provided with a piece 23, which is shaped to resemble the tail of a fish. When the motor is in operation, the tail is caused to oscillate, and thus simulate the action of a natural fish when swimming. The tail also acts as a governor to control the speed of the motor.

A bail 24 extends outwardly from the head of the bait and carries hooks 25. The bail protects the propeller and prevents it from being entangled in weeds. It also serves as attaching means for the line 26. The tail is protected by a similar bail 27, which also carries hooks 28. Hooks 29 are also secured to the body of the bait near the head thereof.

Having thus described my invention, what is claimed as new, and desired to be secured by Letters Patent, is—

1. An artificial bait comprising a body; a motor carried thereby; and a propeller driven by the motor.

2. An artificial bait comprising a body; a motor carried thereby; a propeller driven by the motor; a tail; and operative connections between the motor and the tail for oscillating the latter.

3. An artificial bait comprising a body; a motor carried thereby; a propeller driven by the motor; a tail; operative connections between the motor and the tail for oscillating the latter; and weed-guards for the propeller and tail.

4. An artificial bait comprising a body; a motor carried thereby; a propeller driven by the motor; a tail; operative connections between the motor and the tail for oscillating the latter; weed-guards for the propeller and tail, said weed-guards comprising bails extending from the body; and hooks carried by the bails.

In testimony whereof I have signed my name to this specification in the presence of two subscribing witnesses.

JESSE D. SHERBROOK.

Witnesses:
     J. FRANKLIN MUNRO,
     JOHN A. GIBB.